(No Model.)

E. C. FISHER.
STREET SWEEPER.

No. 503,928. Patented Aug. 22, 1893.

Witnesses
A. M. Blinn
James J. Cutler

Inventor
Elmendorf C. Fisher
By Thomas W. Holiday
Attorney

UNITED STATES PATENT OFFICE.

ELMENDORF C. FISHER, OF PORT RICHMOND, NEW YORK, ASSIGNOR TO THE UNIVERSAL STREET SWEEPING MACHINE COMPANY.

STREET-SWEEPER.

SPECIFICATION forming part of Letters Patent No. 503,928, dated August 22, 1893.

Application filed April 4, 1893. Serial No. 469,034. (No model.)

*To all whom it may concern:*

Be it known that I, ELMENDORF C. FISHER, of Port Richmond, in the county of Richmond, State of New York, have invented Improvements in Street-Sweeping Machines, of which the following is a specification.

This invention consists essentially in the way and manner hereinafter to be described of enlarging or diminishing the diameter of a rotary brush wheel designed by a number of transverse brushes retained independently of each other, and the object of this invention is to facilitate such varying of the wheel's diameter.

Figure 1:
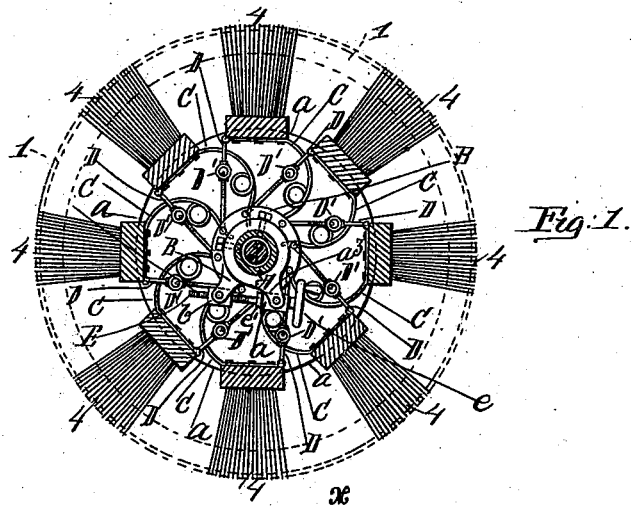
Figure 2:
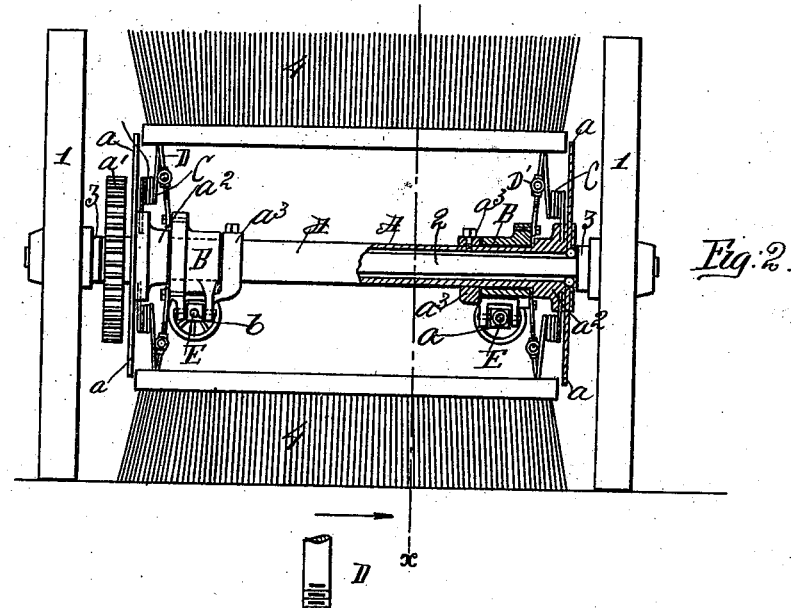
Figure 3:
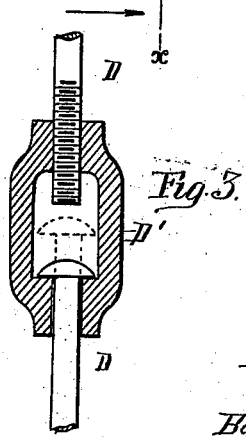

In the drawings Figure 1 is a cross section on line $x, x$ Fig. 2 of a brush wheel, drawn in accordance with my invention, and Fig. 2 is a side view of same, and Fig. 3 is a detail view of the turn-buckle employed in my invention.

(1) represents the vehicle wheels and (2) the axle.

(3) denotes movable collars secured to the axle which are to permit the hollow shaft (4) to surround the said axle between the wheels of the vehicle. The hollow shaft (4) rotates freely upon the axle (2) which can be provided with suitable bearings for such shaft (4).

In the drawings, Fig. 2, illustrates that the hollow shaft has ball bearings at the ends thereof on said axle (2) and that such balls engage with the vertical walls of the collars (3), the axle, and the hollow shaft, and that the vertical ends of said shaft do not contact with the aforesaid collars. Thus it will be seen that these balls prevent abrasion of the hollow shaft, with either the aforesaid collars or vehicle axle, and thus attain efficient bearings for the rotary movement of my brush wheel mechanism. This hollow shaft I provide with suitable brush guard disks ($a$) which are secured to said shaft, also the gear wheel ($a'$). The gear is for transmitting motion, from any suitable means, to the hollow shafts, and the guard disks are to limit a horizontal movement of the brushes (4). To the hollow shaft I also secure the spring retaining collars ($a^2$) and the collars ($a^3$), and between such collars I loosely fit to the hollow shaft the rotary movable stay rod retaining collars (B). The collars ($a^2$) and ($a^3$) are relatively situated so as to permit only a rotary movement of the collars (B).

(C) represents springs of which the design as illustrated by Figs. 1 and 2 I prefer but I do not wish to limit myself to such. By giving several spiral turns of said spring I attain quite a yielding force of the respective arms, and as it were, a giving out in length to such arms through said spring coil, of which the essential object will be hereinafter described. The inner ends of said springs I retain in a rigid manner, by the collars ($a^2$) and the outer ends of such springs I secure to the back of the transverse brushes (4) as shown clearly by Fig. 1 of the drawings. To the opposite side of said brushes from that of the springs, I pivotally connect the outer ends of the stay rods (D), and to the collars (B) opposite to the connection of the inner ends of the aforesaid springs, I pivotally connect the inner ends of such stay-rods. These brush stay rods are in two parts combined by the turn-buckle (D'). The detail view Fig. 3, illustrates in what manner such portions of the stay-rods are combined. The reason for such construction of the stay rods is to effect adjustment in length of such, and to effect an easy yielding movement of such retained brushes. The outer portion of the stay rod, freely, engages the turn-buckle, but cannot become disengaged from such on account of the preventing head within the space of the said turn-buckle. The dotted lines in Fig. 3 represent that such outer portion of the stay rod, has movement in the turn-buckle. The inner portion of the stay rod has a threaded engagement with the above turn-buckle and which is to attain the above mentioned adjustment in length of the stay-rod. By connecting the spring (C) in the manner above explained, such will have a force tending to swing the transverse brush (4) from the outer end of the engaging stay rod (D). Thus it will be seen that such springs will effect an outward pull on the stay rods, and that said stay rods will shorten in length immediately upon the brushes striking slight elevations from the road's level, and that such springs effect a manipulation of the engaged brush capable of traversing while in a rotary movement, the most uneven streets and effect perfect cleaning of such, and in a manner that is universal in movement of such retained brushes.

The stay rod and engaging collars (B) pivotally retain tapped boxes ($b$), and the collars ($a^3$) pivotally retain a bearing box ($a$), through which both boxes, engages, the threaded shaft (E), of which the threaded part only engages with the tapped box ($b$) and the other part of said shaft rotates in the other box ($a$). To this shaft each side of the bearing box is secured a collar ($e'$) and the manipulating hand wheel ($e$), which retains said shaft in such relative manner with said bearing box aforesaid. Thus by rotating said hand wheel and shaft, the shaft will either cause the nut or tapped box to move in one direction or the other according to such movement of said shaft, and the aforesaid nut being retained in the manner aforesaid by the stay-rod collars such collars will move upon the hollow shaft as directed by such retained nut, thus causing the inner ends of both the springs and the stay rods to be either brought nearer together or farther apart and effect accordingly either a greater or smaller diameter of such brush wheel, and by so retaining the aforesaid brushes as before described, and by combining such elements in the organism as above mentioned and as illustrated in the accompanying drawings, I finally attain an efficient adjustable brush wheel.

Having described my invention, I claim—

1. In a rotary brush wheel consisting of several transverse brushes swinging around one common center, a hollow shaft provided with end disks to limit the horizontal movement of the brushes, a suitable gear secured to said hollow shaft for imparting a rotary movement to such, suitable springs having one end retained by the hollow shaft aforesaid, and the other end supporting the brushes, a movable collar fitted loosely on the hollow shaft, stay rods having one end retained pivotally by the movable collar, and the other ends supporting the brushes opposite to the springs aforesaid, a tapped box pivotally retained by such movable collar, a bearing box secured by a fixed collar to the hollow shaft, such fixed collar being on the opposite side of the movable collar, from that of the spring holding collar, a suitable shaft engaging such boxes, and manipulated by a suitable hand wheel, whereby the diameter of the brush wheel is either reduced or enlarged, substantially as set forth.

2. In a rotary brush wheel, consisting of several brushes swinging around a common center, a hollow shaft provided with end disks to limit the horizontal movement of the brushes, a suitable driving gear secured to said hollow shaft, springs having one end retained by the hollow shaft, and the other ends supporting the brushes, and such springs having coiled portions between such connections, a movable collar fitted loosely on the hollow shaft, stay-rods having one end pivotally retained by the said movable collar and the other end suitably supporting, opposite to the above springs, the said brushes, such stay rods having one portion loosely engaging a turn buckle, and the other portion in threaded engagement with such turn buckle, a tapped box pivotally retained by such movable collar, a collar secured to the hollow shaft, next to the movable collar, a bearing box pivotally retained by such fixed collar, a suitable shaft engaging such boxes aforesaid and manipulated by a hand wheel, whereby the diameter of the brush wheel is either reduced or enlarged, substantially as described.

3. In a street sweeping machine, the combination with the vehicle axle, and mechanisms for rotating a wheel brush, of a wheel brush, consisting of several brushes swinging around a common center, a hollow shaft suitably sustained by such axle aforesaid and provided with end disks to limit the horizontal movement of the brushes, a suitable driving gear secured to such hollow shaft, springs connecting the brushes with said hollow shaft, a movable collar fitted loosely on the hollow shaft, stay-rods, adjustable in length, and giving in length, connecting the brushes with such movable collar, a collar secured to the hollow shaft next to the movable collar, suitable boxes pivotally retained by said movable collar and fixed collar, and a suitable shaft engaging such boxes, and provided with suitable manipulating means, whereby the diameter of the brush wheel is either reduced or enlarged, substantially as described.

In testimony whereof I have signed my name to this specification in the presence of two subscribing witnesses.

ELMENDORF C. FISHER.

Witnesses:
H. E. LEMAN,
GEO. W. SIAS.